United States Patent
Michiwaki

(10) Patent No.: US 10,198,678 B2
(45) Date of Patent: Feb. 5, 2019

(54) POWER RECEIVING-TYPE INFORMATION ACQUISITION AND TRANSMISSION DEVICE, AND INFORMATION ACQUISITION SYSTEM

(71) Applicant: NEJILAW INC., Tokyo (JP)

(72) Inventor: Hiroshi Michiwaki, Tokyo (JP)

(73) Assignee: NejiLaw Inc., Tokyo (JP)

( * ) Notice: Subject to any disclaimer, the term of this patent is extended or adjusted under 35 U.S.C. 154(b) by 0 days.

(21) Appl. No.: 15/563,269

(22) PCT Filed: Mar. 31, 2016

(86) PCT No.: PCT/JP2016/060690
§ 371 (c)(1),
(2) Date: Sep. 29, 2017

(87) PCT Pub. No.: WO2016/159247
PCT Pub. Date: Oct. 6, 2016

(65) Prior Publication Data
US 2018/0096237 A1 Apr. 5, 2018

(30) Foreign Application Priority Data

Mar. 31, 2015 (JP) ................................ 2015-070832

(51) Int. Cl.
*G06K 19/06* (2006.01)
*G06K 19/07* (2006.01)
(Continued)

(52) U.S. Cl.
CPC ........ *G06K 19/0702* (2013.01); *G01S 13/755* (2013.01); *G01S 13/758* (2013.01);
(Continued)

(58) Field of Classification Search
CPC .......... G06K 19/06; G06K 19/00; G06K 7/06; G06F 17/00
(Continued)

(56) References Cited

U.S. PATENT DOCUMENTS

| 8,177,137 B2 | 5/2012 | Arai |
| 2004/0000713 A1 | 1/2004 | Yamashita et al. |

(Continued)

FOREIGN PATENT DOCUMENTS

| JP | 2004-24551 | 1/2004 |
| JP | 2004-024551 | 1/2004 |
| WO | WO 2014/137109 | 9/2014 |

OTHER PUBLICATIONS

International Search Report for PCT/JP2016/060690, dated May 24, 2016, 3 pages.
(Continued)

*Primary Examiner* — Edwyn Labaze
(74) *Attorney, Agent, or Firm* — Nixon & Vanderhye P.C.

(57) ABSTRACT

This power receiving-type information acquisition and transmission device 101 is provided with one or more power receiving means 110 which receive power supply waves that can supply power, one or more power storage means 120 which store power obtained by the power receiving means, one or more information acquisition means 130 which acquire information by expending at least part of the aforementioned power of the power receiving means 110 and/or the power storage means 120, and one or more information transmission means 140 which utilize the power from the power storage means 120 to transmit information externally. This enables regular or steady information collection, and enables transmitting said information stably, on a permanent basis and remotely, i.e., either over a short or long distance externally.

5 Claims, 9 Drawing Sheets

(51) Int. Cl.
  *H04B 1/59* (2006.01)
  *G01S 13/75* (2006.01)
  *H02J 50/10* (2016.01)
  *H02J 50/20* (2016.01)
  *H02J 50/30* (2016.01)
  *H02J 50/50* (2016.01)
  *H02M 1/42* (2007.01)

(52) U.S. Cl.
  CPC ............... *H04B 1/59* (2013.01); *H02J 50/10* (2016.02); *H02J 50/20* (2016.02); *H02J 50/30* (2016.02); *H02J 50/50* (2016.02); *H02M 2001/4283* (2013.01)

(58) Field of Classification Search
  USPC ................................ 235/492, 487, 375, 441
  See application file for complete search history.

(56) References Cited

U.S. PATENT DOCUMENTS

| | | |
|---|---|---|
| 2010/0188041 A1 | 7/2010 | Mizuo |
| 2013/0162205 A1* | 6/2013 | Nakamura ............ B60L 11/182 320/108 |
| 2014/0191713 A1 | 7/2014 | Hong et al. |
| 2015/0130275 A1* | 5/2015 | Liu ........................ G06Q 50/06 307/23 |

OTHER PUBLICATIONS

Written Opinion of the ISA for PCT/JP2016/060690, dated May 24, 2016, 5 pages.

* cited by examiner (A)

(B)

POWER RECEIVING-TYPE INFORMATION ACQUISITION AND TRANSMISSION DEVICE, AND INFORMATION ACQUISITION SYSTEM

This application is the U.S. national phase of International Application No. PCT/JP2016/060690 filed 31 Mar. 2016, which designated the U.S. and claims priority to JP Patent Application No. 2015-070832 filed 31 Mar. 2015, the entire contents of each of which are hereby incorporated by reference.

TECHNICAL FIELD

Embodiments of the present invention relate to a power receiving-type information acquisition and transmission device that may acquire and transmit information by obtaining power from an outside.

RELATED ART

In the related art, information is transmitted and received in various situations. Power used to transmit and receive the information depends on a battery, or is supplied from an outside in a wired manner or a wireless manner.

A conventional radio frequency identification (RFID) transmits and receives information through wireless communication of near field (several millimeters (mm) to several meter (m) based on a frequency band) by using an electron induction or a radio wave from an outside, from a tag in which ID information is embedded. The tag may be configured as an integrated circuit of a single chip, which is also referred to as an integrated circuit (IC) chip.

Types of the tag include a passive type of an IC tag (hereinafter, referred to as a passive tag) and an active type of an IC tag (hereinafter, referred to as an active tag). The passive tag receives an electron induction from a reader using a coil on a circuit of the tag, generates an induced electromotive force on the circuit, and operates using the induced electromotive force as an energy source. The passive tag transfer ID information to the reader by transmitting a portion of power generated by the electromotive force using an antenna.

The active tag is embedded with a primary battery. During communication, the active tag generates radio waves with its own power and accordingly, has a relatively long communication distance (1 to 100 m or more) compared to that of the passive tag. Also, the active tag may connect to a sensor and spontaneously notify the change and thus, may be used as a sensor network. Since there are some restrictions on the capacity of an embedded battery, there is a need to feasibly reduce communication counts. For example, a scheme of communicating with a reader through a regular autonomous transmission using an embedded timer or a standby communication scheme of waiting for a transmission instruction from a reader and then communicating with the reader may be employed. The standby communication scheme initiates communication by waiting for a call instead of initiating the communication by itself or by using a passive switch (button) provided to an IC tag itself.

DISCLOSURE OF INVENTION

Technical Goals

A conventional passive tag had the following issues. Since the passive tag operates only when an electron induction is received from a reading device called a reader, configured to read the passive tag, the passive tag has a significantly short valid distance from an electron induction scheme power supply device included in the reader, does not operate a system at a timing at which an electromotive force by electron induction is obtained, and may not be used to regularly sense an external environment. Further, although the passive tag does not need to be embedded with a battery, intensity of transmission waves from the passive tag is significantly small. Accordingly, a communication distance from the passive tag to the reader is short compared to that of an active tag and the passive tag needs to approach the reader.

Since the active tag is embedded with a primary battery, the active tag may regularly or normally sense the external environment. On the other hand, a lifespan of the active tag becomes an issue since the active tag depends on the capacity of the primary battery that is inoperable if the capacity of the primary battery is reduced to reach a predetermined threshold. Also, reducing the consumption of power may require reducing a communication frequency, which leads to degrading the convenience.

The present invention is conceived from the above issues and provides a power receiving-type information acquisition and transmission device that may overcome a lifespan restriction coming from the battery capacity, enables regular or normal collection of permanent information at a remote place, and may stably transmit the information to an outside. Also, the present invention provides a power receiving-type information acquisition and transmission device that may freely control acquisition, recording, storage, and transmission of information even during a continuous or intermittent power supply.

Technical Solutions

According to an aspect of the present invention, there is provided a power receiving-type information acquisition and transmission device that is installed in a member to be measured, including a power receiver configured to receive a power supply wave capable of supplying power; a power storage configured to accumulate power obtained by the power receiver; an information acquirer configured to acquire information by using at least a portion of the power of the power receiver and/or the power storage; and an information transmitter configured to transmit the information to an outside by using the power of the power storage. The information acquirer measures a change in the member.

The information acquirer may acquire information by detecting a surrounding physical phenomenon.

A timing at which the information acquirer may acquire the information is controlled by a collection timing controller.

The collection timing controller may determine, as the information acquisition timing, a case of satisfying at least one condition among a case in which the power receiver receives the power supply wave, and/or, a case in which a preset collection time is elapsed, and/or, a case in which a time corresponding to a time constant of the power storage is elapsed, and/or, a case in which a charge amount of the power storage reaches a predetermined threshold, and/or, a case in which a collection instruction signal is received from an outside.

The collection timing controller may determine, as the information acquisition timing, a case of simultaneously satisfying a plurality of combinations of conditions selected from among a case in which the power receiver receives the power supply wave, a case in which a preset collection time is elapsed, a case in which a time corresponding to a time constant of the power storage is elapsed, a case in which a charge amount of the power storage reaches a predetermined threshold, and a case in which a collection instruction signal is received from an outside.

The power receiving-type information acquisition and transmission device may include a transmission timing controller configured to control a timing at which the information transmitter transmits the information.

The transmission timing controller determines, as the information transmission timing, a case of satisfying at least one condition among a case in which a preset transmission time is elapsed, and/or, a case in which a time corresponding to a time constant of the power storage is elapsed, and/or, a case in which a charge amount of the power storage reaches a predetermined threshold, and/or, a case in which the information acquired by the information acquirer satisfies a predetermined condition, and/or, a case in which a transmission instruction signal is received from outside, and/or, a case in which the power receiver receives the power supply wave.

The transmission timing controller may determine, as the information transmission timing, a case of simultaneously satisfying a plurality of combinations of conditions selected from among a case in which a preset transmission time is elapsed, a case in which a time corresponding to a time constant of the power storage is elapsed, a case in which a charge amount of the power storage reaches a predetermined threshold, a case in which the information acquired by the information acquirer satisfies a predetermined condition, a case in which a transmission instruction signal is received from an outside, and a case in which the power receiver receives the power supply wave.

The power receiving-type information acquisition and transmission device may include a distribution controller configured to distribute a portion of the power converted by the power receiver to the information acquirer.

The power supply wave may include at least one of an electromagnetic wave including a γ-ray, an X-ray, an ultraviolet (UV) ray, an infrared (IR) ray, a laser light, and a radio wave including a microwave, and wave energy including a sound wave that includes an ultrasonic wave or an elastic wave that includes a solid vibration.

The power receiving-type information acquisition and transmission device may include a rectifier configured to rectify the power obtained by the power receiver.

The information acquirer may connect to one of a storage configured to store the information, an operation processor configured to perform a predetermined operation, and a controller configured to perform a predetermined control.

An integrated chip (IC) tag may be provided.

According to an aspect of the present invention, there is provided an information acquisition system including the power receiving-type information acquisition and transmission device disclosed in any of the above descriptions; and a power supply device configured to transmit a power supply wave capable of supplying power to the power receiver of the power receiving-side information acquisition and transmission device.

The information acquisition system may include a receiver configured to receive the information that is transmitted to an outside from the information transmitter of the power receiving-type information acquisition and transmission device.

The power supply device and the reception device may be integrated.

Instruction information about a timing at which the information acquirer acquires the information may be overlapped with respect to the power supply wave.

Instruction information about a timing at which the information transmitter transmits the information to the outside may be overlapped with respect to the power supply wave.

A power supply amount per unit time supplied from the power supply device to the power receiving-side information acquisition and transmission device may be greater than a power consumption amount per unit time including natural discharge of the power receiving-side information acquisition and transmission device.

A transmission amount of the power supply wave by the power supply device may vary based on a transmission frequency of the information of the information transmitter or an acquisition frequency of the information of the information acquirer in the power receiving-side information acquisition and transmission device.

Effects

According to the present invention, it is possible to always and/or permanently or normally and/or regularly collect information without paying attention to processing of wiring or a lifespan of an embedded battery by a wired power supply, and to stably transmit the information at a remote location, that is, to an outside in a near distance to a far distance in a wireless manner.

BEST MODE FOR CARRYING OUT THE INVENTION

Hereinafter, embodiments of the present invention are described in detail with reference to the accompanying drawings.

Figure 1A:
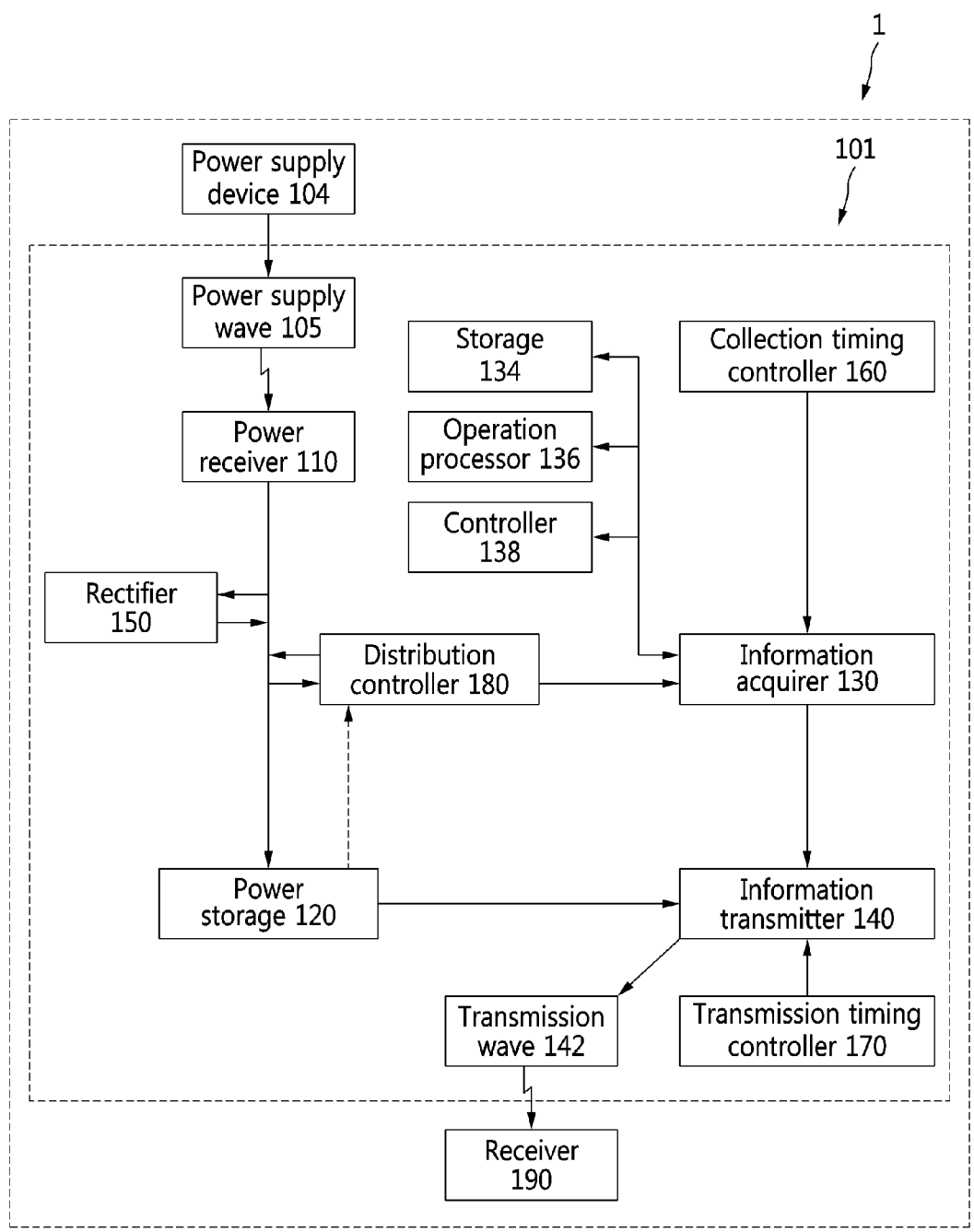
FIG. 1A is a block diagram illustrating an entire configuration of a power receiving-type information acquisition and transmission device according to an embodiment.

FIG. 1A illustrates a power receiving-type information acquisition and transmission device 101 according to an embodiment of the present invention. The power receiving-type information acquisition and transmission device 101 includes at least one power receiver 110, at least one power storage 120, at least one information acquirer 130, and at least one information transmitter 140.

The power receiver 110 receives a power supply wave 105 generated from a power supply device 104 and converts the power supply wave 105 to power. The power supply wave 105 may be a wave capable of transferring energy even in a wireless state, and may include, as a representative example, an electromagnetic wave in which electromagnetic energy may propagate in a space. The electromagnetic wave includes a γ-ray or an X-ray having a short wavelength, a laser light that is a broad sense of light, and includes an ultraviolet (UV) ray, a visible ray, an infrared (IR) ray, a radio wave having a relatively long wavelength, a microwave, an ultra-short wave, a short wave, a medium wave, a long wave, an ultra-long wave, a very long wave, and an extremely long wave. Also, a sound wave or an elastic wave of a solid vibration for transferring solid may be used as the power supply wave 105. Also, the entire device configuration including the power supply device 104 may be defined as an information acquisition system 1.

The power supply device 104 includes an antenna, a laser element, a light emitting element, a speaker, an ultrasonic wave transmitter, and a vibrator to generate the power supply wave 105. A transmission timing of the power supply wave 105 by the power supply device 104 may be consecutive or intermittent. For example, the power supply wave 105 may be transmitted periodically at predetermined time intervals and also, may be normally transmitted. As the antenna, at least one of directional and/or non-directional antennas may be used. In detail, for example, a monopole antenna, a dipole antenna, a Yagi antenna, a planar antenna, a flat antenna, and a parabolic antenna may be used. If a distance between the power supply device 104 and the power receiver 110 is relatively close, magnetic coupling of mutual coils, that is, loop antennas may be performed and the power may be transferred by electron induction.

The power receiver 110 may employ at least one of various structures and may also employ a plurality of structures. For example, the power receiver 110 receives the power supply wave 105 through an energy conversion element, such as, for example, a coil, an antenna, a light receiver (a photonic element based member, a solar panel), a microphone, a piezoelectric element, or a vibrator, configured to convert a vibration or a pressure change to electrical energy, and converts the power supply wave 105 to power.

Also, as an another power supply scheme, for example, a sound wave may be used as the power supply wave 105 and a Seebeck effect element (circuit) that obtains an electromotive force using the Seebeck effect may be used as the power receiver 110. In this case, a high-density medium area and a low-density medium area that are alternately generated among mediums by a sound pressure of an appropriate frequency sound wave used as the power supply wave 105 may be replaced. A first connect point and a second contact point of the Seebeck element are positioned on the respective areas that are alternately generated. At a timing at which the high-density medium area surrounds the first contact point, the first contact point becomes a hot junction and at this moment, the second contact point is surrounded by the low-density medium area and becomes a cold junction. In this manner, an electromotive force is generated in a predetermined direction. When the high-density medium area and the low-density medium area are changed, a hot junction side and a cold junction side are changed at the first contact point and the second contact point, thereby obtaining alternating current (AC) in which a current direction of the electromotive force changes due to a temperature difference. Also, the corresponding Seebeck element may be configured to generate a normal electromotive force by providing, as a sound source, the power supply devices 104, 104 at different two points in the space, by generating a sound field in which sound waves are superposed, and, as a result, by setting a state in which a normal density difference is present between the first contact point and the second contact point of the Seebeck element. The aforementioned method of setting, as the sound source, the power supply devices 104, 104 at appropriate two or more points on the space may be configured such that, for example, the two power supply devices 104, 104 and the power receiver 110 are aligned in a straight line by providing the power receiver 110 between the two power supply devices 104, 104, and the power supply wave 105 is generated from each of the power supply devices 104, 104 toward the power receiver 110. Through this configuration, the power supply wave 105 at the power receiver 110 becomes a normal wave and thus, a normal temperature difference may be generated on a predetermined portion and direct current (DC) may be generated.

Also, without being limited to a case in which the power receiver 110 receives a power supply wave generated from the power supply device 104, the power receiver 110 may receive a power supply wave that is naturally generated due to a change in a surrounding environment and may convert the power supply wave to power. Here, the change in the surrounding environment includes, for example, a vibration, a change in temperature, external light (illumination light or natural light), a change in pressure (change in atmospheric pressure), and a change in external force (wind, buoyancy change, rainfall). A combination of natural environmental variation and the power supply device 104 may be used.

The power storage 120 accumulates the power obtained by the power receiver 110. The power storage 120 may employ various structures, for example, a condenser (capacitor), such as a single plate type, a swing type, a lamination type, a penetration type, an electrolytic type, and an electric double layer type, or various types of storage batteries (secondary batteries), i.e., chargeable batteries, such as a chemical battery type, and a physical battery type.

The information acquirer 130 acquires information and maintains the acquired information temporarily or during a long term. The power used to operate the information acquirer 130 may be selectively received directly from the power receiver 110 or indirectly from the power storage 120. In any case, the information acquirer 130 is configured to acquire information and to maintain the acquired information by using a portion of the power obtained by the power receiver 110.

The information acquirer 130 includes at least one sensor, and detects a physical phenomenon occurring in surroundings and acquires the information. The information acquirer 130 may be, for example, an acceleration sensor, a mechanical sensor (a strain gauge, a pressure sensor), a temperature sensor, an odor sensor, a specific particle functional sensor, a radiation sensor, an imaging sensor (a camera), a wetting sensor, a microphone, a location sensor (a global positioning system (GPS)), a gyro sensor, a human detection sensor, and a dielectric (capacitance) sensor. The information acquirer 130 may be defined as a device that inputs information to the power receiving-type information acquisition and transmission device 101. Also, the information acquirer 130 may electrically connect to a storage 134, an operation processor 136, and a controller 138. The storage 134 is called a memory, and stores information acquired by the information acquirer 130, stores a predetermined program, or records setting information. The operation processor 136 is called a central processing unit (CPU), and performs various types of information processing by executing a program. For example, the operation processor 136 stores information input from the information acquirer 130 in the storage 134, extracts information from the storage 134 and transmits the extracted information to the information transmitter 140, or determines contents of information. The controller 138 functions as a control circuit that controls the information acquirer 130 or the information transmitter 140 in conjunction with the storage 134. Also, the controller 138 may be configured to execute a control that is performed by a collection timing controller 160, a transmission timing controller 170, or a distribution controller 180 to be described below.

The information transmitter 140 transmits information maintained by the information acquirer 130 to an outside using the power of the power storage 120. The information transmitter 140 may employ various types of structures. The information transmitter 140 transfers information by generating a transmission wave 142, such as a radio wave, light, and sound, by an antenna, a light emitter (a light emitting element), or a speaker. The transmission wave 142 is received by an antenna of a receiver 190 and information is regularly retrieved. Also, the receiver 190 and the power supply device 104 may be integrally configured. Here, the transmitter 140 may perform transmission in response to an instruction of a response signal and information may be transferred to the receiver 190 by overlapping the power supply wave 105 and the response signal.

Also, information transmitted from the information transmitter 140 may be removed from the storage 134 to secure storage capacity of the storage 134.

Also, the power receiving-type information acquisition and transmission device 101 may include a rectifier 150, the collection timing controller 160, the transmission timing controller 170, and the distribution controller 180.

The rectifier 150 is called a rectifier or a rectification circuit, and rectifies the power obtained by the power receiver 110. In detail, the rectifier 150 converts, to the direct current, the alternating current that is obtained by converting the power supply wave 105. A portion of the rectified direct current may be directly or indirectly supplied to the information acquirer 130, and a remaining thereof may be accumulated in the power storage 120. The rectification circuit may use, for example, a half-wave rectification circuit using a diode, an all-wave (both wave) rectification circuit, and a bridge circuit.

The collection timing controller 160 determines a timing at which the information acquirer 130 collects information. The collection timing may be determined based on, for example, the following selection conditions.

(1) A case in which the power receiver 110 receives the power supply wave 105: In detail, this case corresponds to a case in which power is generated by the power receiver 110 and a portion of the power is supplied to the information acquirer 130 through the distribution controller 180, and the information acquirer 130 operates to acquire information. In this case, both of the distribution controller 180 configured to distribute the power and the information acquirer 130 configured to collect and process information function as the collection timing controller 160. Also, the information acquirer 130 does not need to collect information at every timing at which the power receiver 110 receives the power supply wave 105, and may be controlled to collect information every ten times at which the power is received.

(2) A case in which a preset collection time is elapsed: In detail, the collection timing controller 160 includes a timer and/or a clock and issues an instruction to the information acquirer 130 based on the preset collection time, and the information acquirer 130 acquires information from an outside and/or an inside. The timer and/or the clock may not be a constituent element of the collection timing controller 160. The timer and/or the clock may be provided in the power receiving-type information acquisition and transmission device 101 and the collection timing controller 160 may be configured to acquire timer information and/or clock information from the timer and/or the clock and to control a collection time or timing based on the time information. A specific date may be set to the collection time and/or the collection timing. Also, a collection time interval (for example, every three hours) may be set thereto. The above function may be realized by storing a program for realizing the collection timing controller 160 in the storage 134 and by executing the program using the operation processor 136. In addition, the collection timing controller 160 may be set to include, for example, a radio wave clock, to receive a time radio wave generated from a clock tower, and to acquire and collect information using the information acquirer 130.

(3) A case in which a predetermined time corresponding to a time constant of the power storage 120 is elapsed: In detail, the collection timing controller 160 may be configured to store and maintain a time that is specified based on the time constant of the power storage 120 and to issue an instruction to the information acquirer 130 at a point in time at which the specified time is elapsed based on the timer, so that the information acquirer 130 may acquire information.

(4) A case in which a charge amount of the power storage 120 reaches a predetermined threshold: For example, if a value exceeding a power amount required when the information acquirer 130 collects information is set as the threshold and, in this instance, the charge amount of the power storage 120 is determined to exceed the corresponding threshold through monitoring of the collection timing controller 160 or the distribution controller 180, an instruction is issued to the information acquirer 130 to acquire information. Using this condition, if the charge amount of the power storage 120 does not reach the predetermined threshold, it indicates that a storage priority mode is set by suppressing an amount of power used by the information acquirer 130.

(5) A case in which a collection instruction signal is received from an outside: In detail, when the collection timing controller 160 receives the collection instruction signal from the outside in a wireless or wired manner, the collection timing controller 160 issues an instruction to the information acquirer 130 and the information acquirer 130 acquires information. The collection instruction signal may be included in the power supply wave 105 of the power supply device 104.

Also, one of the conditions, (1) to (5), may be set as the collection timing and a plurality thereof may be set as the collection timing. Also, a case of simultaneously satisfying a plurality of conditions selected from among the conditions, (1) to (5), may be set as the collection timing. Also, a collection frequency may be changed based on the conditions, (1) to (5). Also, a condition excluding the conditions, (1) to (5), may be set.

For example, if the charge amount of the power storage 120 does not reach the threshold and accordingly, information is not transmitted from the information transmitter 140, information acquisition by the information acquirer 130 may be temporarily stopped or a mode may be changed to decrease a collection frequency. Through this, the storage 134 may have a sufficient free space. Also, if the charge amount of the power storage 120 does not reach the predetermined threshold or if the free space of the storage 134 is insufficient, information of low importance may be deleted (or, allowed to be overwritten) from the storage 134. For example, a normal value or information of the normal value may be deleted from the storage 134 (or overwrite may be allowed) and an abnormal value may be preferentially maintained.

Also, the collection timing controller 160 may be configured to execute a control that is performed by the aforementioned controller 138, or the transmission timing controller 170 or the distribution controller 180 to be described blow. On the contrary, a control performed by the collection timing controller 160 may be configured to be executed by another controller, for example, the controller 138, the transmission timing controller 180, or the distribution controller 180.

The transmission timing controller 170 determines a timing at which the information transmitter 140 transmits information acquired by the information acquirer 130. The transmission timing may be determined based on, for example, the following collection conditions.

(1) A case in which a preset transmission time is elapsed: In detail, the transmission timing controller 170 includes a timer and/or a clock and issues an instruction to the information transmitter 140 based on the preset transmission time to transmit information. Here, the timer and/or the clock may not be a constituent element of the transmission timing controller 170 and may be provided in the power receiving-type information acquisition and transmission device 101. The transmission timing controller 170 may be configured to acquire timer information and/or clock information from the timer and/or the clock and to control the transmission time or timing based on the time information. A specific date may be set to the transmission time, and a transmission time interval (for example, every day) may be set. Here, the above function may be realized by storing a program for realizing the transmission timing controller 170 in the storage 134 and by executing the program using the operation processor 136. In addition, the transmission timing controller 170 may be set to include, for example, a radio wave clock, to receive a time radio wave generated from a clock tower, and to transmit information using the information transmitter 140 at an appropriate time.

(2) A case in which a predetermined time corresponding to a time constant of the power storage 120 is elapsed: In detail, when the predetermined time corresponding to the time constant is determined to be elapsed from starting charge in a time zone in which the power storage 120 is being charged, the transmission timing controller 170 issues an instruction to the information transmitter 140 to transmit information. Through this, information may be transmitted by verifying a state in which the power storage 120 is sufficiently charged and by activating the information transmitter 140.

(3) A case in which a charge amount of the power storage 120 reaches a predetermined threshold: For example, if a value exceeding a power amount required when the information transmitter 140 transmits information is set as the threshold and, in this instance, the charge amount of the power storage 120 is determined to exceed the corresponding threshold through monitoring of the transmission timing controller 170 or the distribution controller 180, the transmission timing controller 170 issues an instruction to information transmitter 140 and the information transmitter 140 transmits information.

(4) A case in which information acquired by the information acquirer 130 satisfies a predetermined condition: In detail, the transmission timing controller 170 determines whether the collected information is an abnormal value and, when the collected information is determined as the abnormal value, issues an instruction to the information transmitter 140 and the information transmitter 140 transmits information. Through this, it is possible to transmit information quickly although abnormality occurs. Alternatively, the collected information may be set to be transmitted when the collected information deviates from the range of the threshold.

(5) A case in which a transmission instruction signal is received from an outside: In detail, when the transmission timing controller 170 receives the transmission instruction signal from the outside in a wireless or wired manner, the transmission timing controller 170 issues an instruction to the information transmitter 140 and the information transmitter 140 transmits information. The transmission instruction signal may be included in the power supply wave 105 of the power supply device 104. Alternatively, the receiver 190 may transmit the transmission instruction signal and the transmission timing controller 170 may receive the transmission instruction signal through the information transmitter 140.

(6) A case in which the power receiver 110 receives the power supply wave 105: Also, there is no need to transmit information at every timing at which the power receiver 110 receives the power supply wave 105. For example, information may be controlled to be transmitted every ten times at which the power is received. Alternatively, information may be set to be transmitted at a timing at which a storage amount of the power storage 120 exceeds by a predetermined amount or more as a result of receiving, by the power receiver 110, a predetermined amount of the power supply 105.

Also, one of the conditions, (1) to (6), may be set as the transmission timing and a plurality thereof may be set as the transmission timing. Also, a case of simultaneously satisfying a plurality of conditions selected from among the conditions, (1) to (6), may be set as the transmission timing.

Also, the transmission timing controller 170 may be configured to execute a control that is performed by the aforementioned controller 138, or the collection timing controller 160 or the distribution controller 180 to be described below. On the contrary, a control performed by the transmission timing controller 170 may be configured to be executed by another controller, for example, the controller 138, the collection timing controller 160, or the distribution controller 180.

Once the power receiver 110 is supplied with the power, the distribution controller 180 distributes a portion of the power to the information acquirer 130 and at the same time, distributes a portion or a remaining of the other power to the power storage 120. A distribution method, such as a distribution portion or a distribution timing, may be appropriately set. The distribution controller 180 may distribute the power to the information acquirer 130 and the power storage 120 based on a predetermined current ratio or voltage ratio, or based on a time division. Alternatively, the distribution controller 180 may be set to distribute the power to the information acquirer 130 when a charging rate of the power storage 120 reaches a predetermined value or more, for example, a charge amount at which the transmitter 140 is capable of transmitting information. Also, the distribution controller 180 may have a function of monitoring a state (storage information) of the power storage 120. In this case, the distribution controller 180 may be included in a single sensor of the information acquirer 130 and the storage information may be maintained by the information acquirer 130. Also, the distribution controller 180 may acquire and/or maintain the storage information independently from the information acquirer 130. Also, the distribution controller 180 may be configured to execute the aforementioned control that is performed by the controller 138, the collection timing controller 160, or the transmission timing controller 170. On the contrary, a control that is performed by the distribution controller 180 may be configured to be executed by another controller, for example, the controller 138, the collection timing controller 160, or the transmission timing controller 170.

Figure 1B:
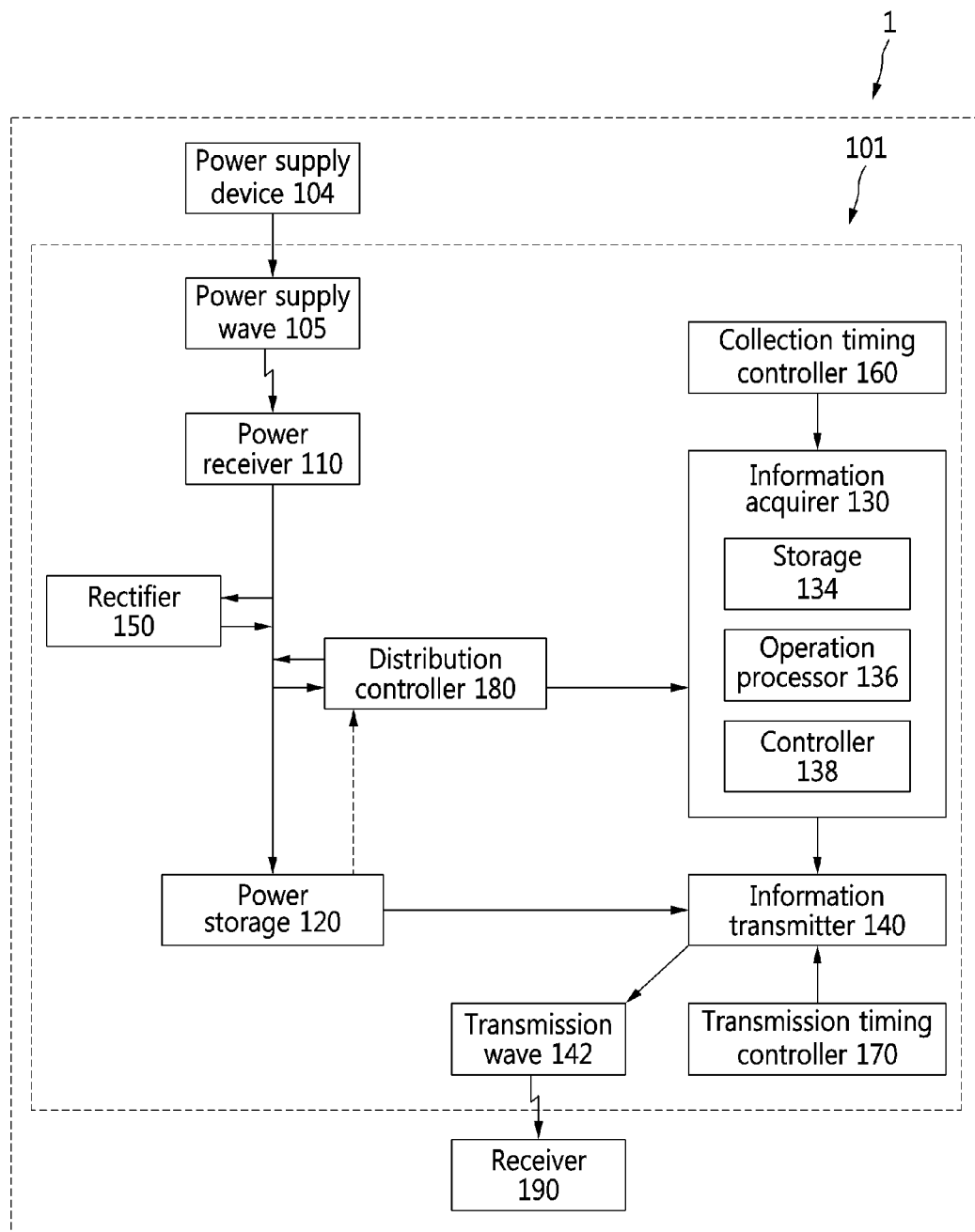
FIG. 1B is a block diagram illustrating another example of the entire configuration of the power receiving-type information acquisition and transmission device.

Also, although FIG. 1A illustrates a case in which the information acquirer 130 is connected to the storage 134, the operation processor 136, and the controller 138 present outside, the present invention is not limited thereto. For example, referring to FIG. 1B, the information acquirer 130 may integrally include the storage 134, the operation processor 136, and the controller 138. Also, the information acquirer 130 may integrally include the collection timing controller 160, the transmission timing controller 170, and the distribution controller 180.

Hereinafter, an operation of the power receiving-type information acquisition and transmission device 101 is described.

Figure 2:
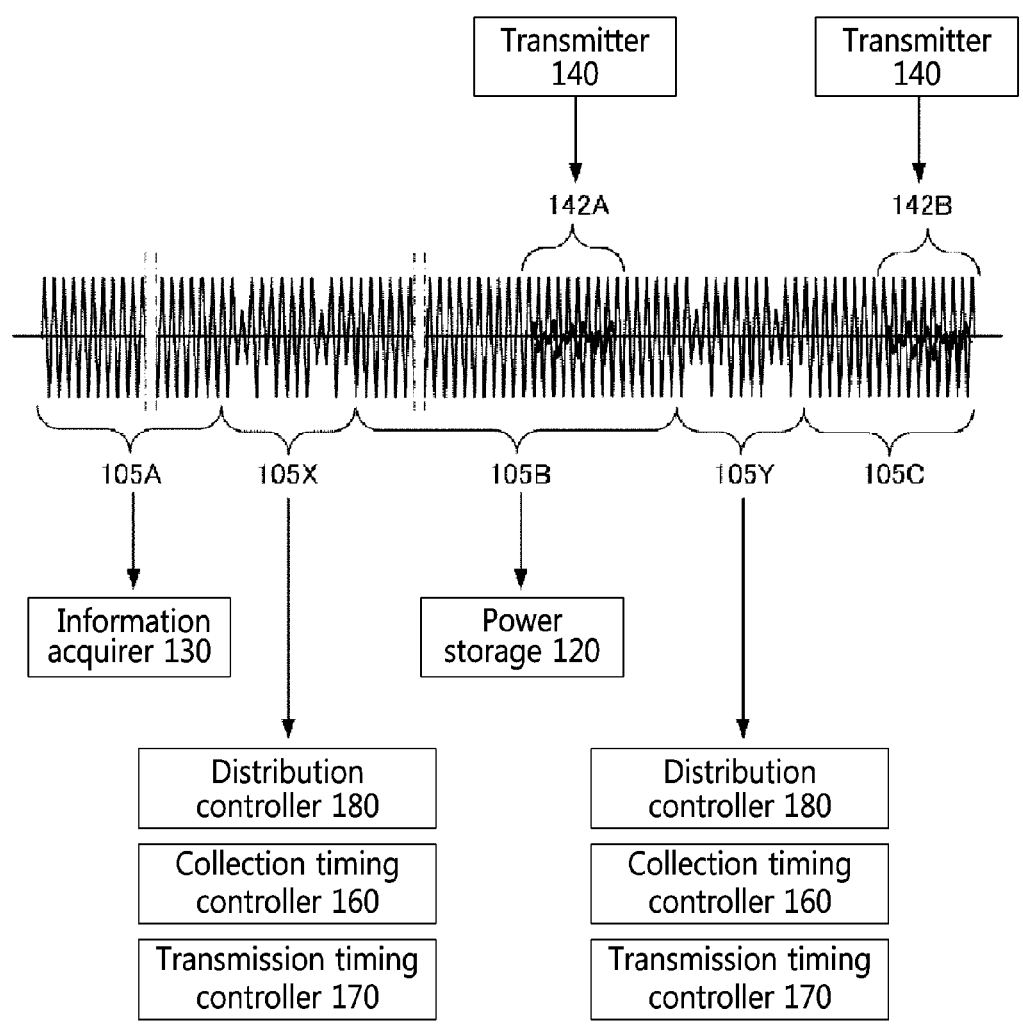
FIG. 2 is a diagram illustrating a configuration of a power supply wave of the power receiving-type information acquisition and transmission device.

Referring to FIG. 2, the power supply wave 105 generated from the power supply device 104 includes, for example, one or more un-modulated wave areas and one or more modulated wave area. Here, the un-modulated wave area is used to transmit power to the power receiver 110 and/or, to receive an information transmission signal (a response signal) from the information transmitter 140 of the power receiving-type information acquisition and transmission device 101. The modulated wave area is used to transmit a signal (command) to the power receiving-type information acquisition and transmission device 101. In detail, in the present embodiment, for example, the power supply wave 105 includes a first un-modulated wave area 105A, a first modulated wave area 105X, a second un-modulated wave area 105B, a second modulated wave area 105Y, and a third un-modulated wave area 105C in temporal order. Also, the power supply wave 105 includes a plurality of information transmission signal areas, for example, a first transmission signal area 142A and a second transmission signal area 142B, generated from the information transmitter 140. The first transmission signal area 142A overlaps the second un-modulated wave area 105B as a reflected wave and the second transmission signal area 142B overlaps the third un-modulated wave area 105C as a reflected wave.

For example, power that is acquired by the power receiver 110 by converting the first un-modulated wave area 105A is used by the distribution controller 180 as a power source of the information acquirer 130. Accordingly, an amount of power transferred using the first un-modulated wave area 105A may need to be sufficient to activate the information acquirer 130, to acquire information from an inside and/or an outside, to execute various types of operations using the operation processor 136, or to execute various types of controls using the controller 138.

As another example, a signal (command) included in the first modulated wave area 105X or the second modulated wave area 105Y may include the following signals:
(1) A storage switching signal refers to a signal that instructs the distribution controller 180 to distribute the power being supplied to the information acquirer 130 to the power storage 120, or a signal that instructs the distribution controller 180 to distribute the power being supplied to the power storage 120 to the information acquirer 130.
(2) A collection time signal refers to a signal that sets a collection timing at which the information acquirer 130 collects information.
(3) A collection instruction signal refers to a signal that instructs the information acquirer 130 to collect information.
(4) A transmission time signal refers to a signal that sets a transmission timing at which the information transmitter 140 transmits information.
(5) A transmission instruction signal refers to a signal that instructs the information transmitter 140 to transmit information.

For example, when the storage switching signal of (1) is included in the first modulated wave area 105X, the distribution controller 180 distributes the power of the second un-modulated wave area 105B to a charging side of the power storage 120. Although a case of preferentially distributing the power of the first un-modulated wave area 105A to activate the information acquirer 130 is described herein as an example, the present invention is not limited thereto. Once charging of the power storage 120 is completed by using the power of the first un-modulated wave area 105A and the second un-modulated wave area 105B to charge the power storage 120, surplus power may be simultaneously distributed to activate the information acquirer 130. Also, the third un-modulated wave area 105C may be used for charging of the power storage 120 or for activation of the information acquirer 130, however, generally used for reception of the second transmission signal area 142B.

A signal included in the first transmission signal area 142A or the second transmission signal area 142B may include the following information:
(1) Identification information refers to entity identification information that is used to identify the power receiving-type information acquisition and transmission device 101 or the information acquirer 130 (a sensor).
(2) Acquisition information refers to information that is collected by the information acquirer 130.
(3) Storage information refers to information that represents a storage amount of the power storage 120.

For example, when a storage amount of the power storage 120 is determined to be insufficient based on storage information included in the first transmission signal area 142A or the second transmission signal area 142B, the power supply device 104 may increase a transmission time of the second un-modulated wave area 105B or the third un-modulated wave area 105C, or may increase an output. Also, when charging of the power storage 120 is determined to be being completed (being approximately completed) based on the same storage information, the power supply device 104 may decrease the transmission time of the second un-modulated wave area 105B or the third un-modulated wave area 105C, or may decrease the output.

Figure 3:
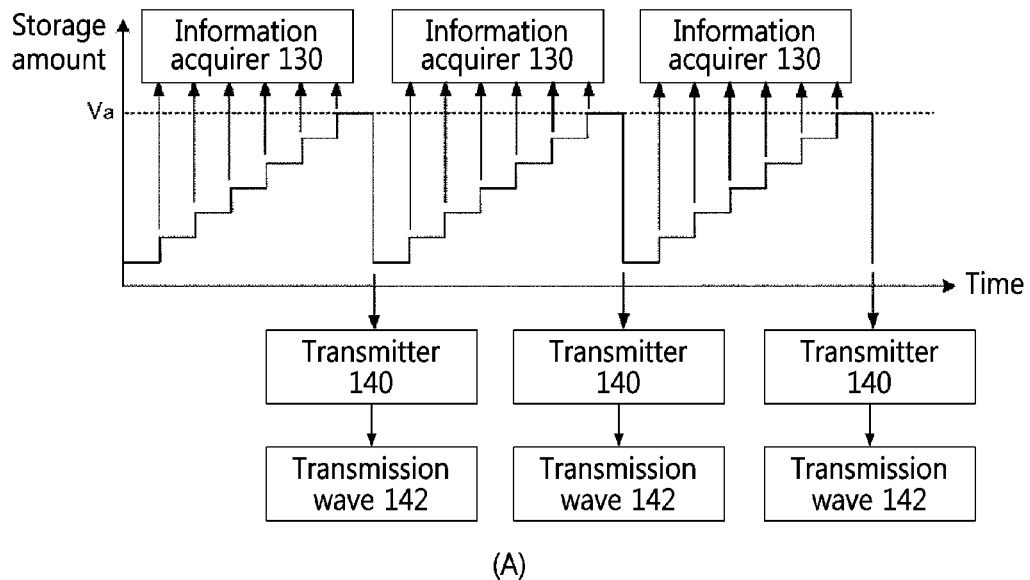
FIG. 3, (A), illustrates a storage state of a power storage of a battery type, and, (B), illustrates a storage state of a power storage of a condenser type.
Figure 3:
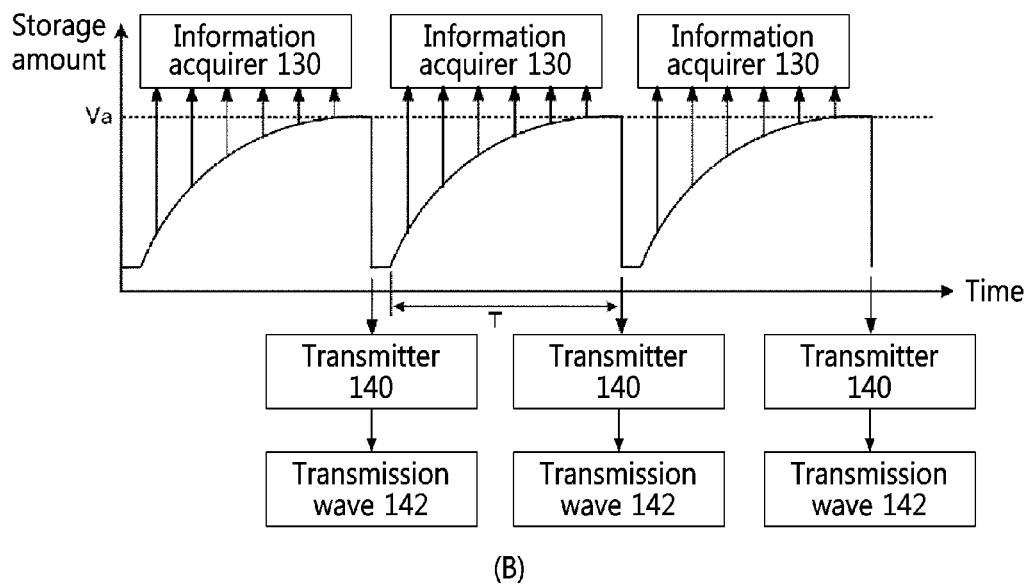

FIG. 3 illustrates a storage state of the power storage 120. For example, referring to (A) of FIG. 3, when the power storage 120 is a battery, a charge amount of the power storage 120 step-wisely increases every time the power receiver 110 receives the power supply wave 105. That is, in the present embodiment, charging of the power storage 120 is set to not be completed only with a single power supply wave 105. If storage is completed with only the single power supply wave 105, energy of radio waves may be wasted afterwards when frequently transmitting various commands to the information acquirer 130 using the power supply wave 105.

In addition, in the information acquisition system 1, a power supply amount per unit time (converted to the power by the power receiver 110) supplied from the power supply device 104 to the power receiving-side information acquisition and transmission device 101 is great than a power consumption amount per unit time including natural discharging in the power receiving-side information acquisition and the transmission device 101. The term "per unit time" refers to a value acquired by significantly normalizing a unit time based on a total power amount of, for example, a predetermined time (one day, one week, or one moth). In detail, the power consumption amount of the power receiving-side information acquisition and transmission device 101 includes natural discharge occurring in the power storage 120, power used to acquire information using the information acquirer 130, power used to transmit information using the information transmitter 140, and power used in association with control related operations of the storage 134, the operation processor 136.

Also, in the present embodiment, the transmission timing controller 170 may be configured to instruct the information transmitter 140 to transmit information when the storage amount of the power storage 120 reaches a threshold Va causing a predetermined reaction. Through this information transmission, the power of the power storage 120 is used and the storage amount decreases significantly. However, the power is step-wisely stored again by regularly receiving the power supply wave 105. By repeating the above operation, it is possible to realize periodic long-term information transmission or permanent information transmission by a far distance, which uses a relative large power amount and may not be realized in the related art. Also, every time the power receiver 110 receives the power supply wave 105, the information acquirer 130 may acquire information. In this case, the information transmitter 140 may collectively transmit information corresponding to multiple times. Accordingly, it is possible to enhance the efficiency.

As another example, when the power storage 120 is a condenser, voltage waveforms of (B) of FIG. 3 are acquired. That is, every time the power receiver 110 receives the power supply wave 105 a plurality of number of times, a storage amount of the condenser increases gradually. Since the condenser is associated with a time constant according to an increase in the storage amount, the condenser may not readily store the power. That is, the storage capacity of the condenser may be set to sufficiently exceed an electricity equivalent to power consumption required for one-time information transmission by the information transmitter 140. When the storage amount of the power storage 120 reaches the threshold Va causing the predetermined reaction, the transmission timing controller 170 instructs the information transmitter 140 to transmit information. Through this information transmission, the power of the power storage 120 is used and the storage amount decreases significantly. However, the power is stored again by receiving the power supply wave 105. By repeating the above operation, the information transmitter 140 may transmit information regularly and permanently.

Also, although not particularly illustrated herein, a transmission amount of the power supply wave by the power supply device 104 may vary based on an information transmission frequency of the information transmitter 140 in the power receiving-side information acquisition and transmission device 101. For example, when the information transmission frequency of the information transmitter 140 decreases, a transmission amount (a one-time transmission amount or transmission frequency) of the power supply wave by the power supply device 104 is increased. A case in which the transmission frequency decreases indicates a decrease in the power storage efficiency and an increase in a time until the storage amount reaches the threshold Va causing the predetermined reaction due to a degradation of the power storage 120. Here, the transmission frequency of the information transmitter 140 is uniformly maintained by increasing the transmission amount of the power supply wave. Also, although the transmission amount of the power supply wave by the power supply device 104 increases, the transmission frequency of the information transmitter 140 may not increase. In this case, the receiver 190 may determine that some issues have occurred in addition to the degradation of the power storage 120.

As described, the transmission amount of the power supply wave by the power supply device 104 may vary based on the information acquisition frequency of the information acquirer 143 in the power receiving-side information acquisition and transmission device 101. For example, when the information acquisition frequency of the information acquirer 130 decreases, the transmission amount (a one-time transmission amount or transmission frequency) of the power supply wave by the power supply device 104 is increased. A case in which the information acquisition frequency decreases indicates, for example, a decrease in the power storage efficiency and an increase a time until the storage amount reaches the predetermined threshold for information acquisition due to a degradation of the power storage 120. Here, the acquisition frequency of the information acquirer 130 is uniformly maintained by increasing a transmission amount of the power supply wave. Also, although the transmission amount of the power supply wave by the power supply device 104 increases, the acquisition frequency of the information acquirer 130 may not increase. In this case, the receiver 190 may determine that some issues have occurred in addition to the degradation of the power storage 120.

Also, although a case of setting the power storage of the power storage 120 to exceed a predetermined value through multiple charges is described herein as an example, the power storage may be completed with a one-time charge. Through this, it is possible to reduce an amount of time (i.e., a time T based on the time constant) until the power storage of the power storage 120 is completed or until a storage rate reaches the predetermined threshold.

According to the power receiving-type information acquisition and transmission device 101 of the present embodiment, power is supplied using, for example, the power supply wave 105 that is radiated into a space. That is, it is passive with respect to the power supply. Here, the information acquirer 130 may be supplied with the power directly or indirectly from the power receiver 110 that converts energy of the power supply wave 105 to the power and may acquire information using a sensor.

The power supply by the power supply wave 105 is relatively small. In particular, if a distance between the power supply device 104 and the power receiver 110 increases, the energy transfer efficiency is degraded. In the present example embodiment, minute surplus power not used by the information acquirer 130 or energy exceeding the power used by the information acquirer 130 is supplied using the power supply wave 105 and the surplus power is successively stored in the power storage 120 little by little. As another example, the information transmission frequency is reduced compared to the information collection frequency of the information acquirer 130. As a result, sufficient power may be stored in the power storage 120. Thus, the information transmitter 140 may wirelessly transmit information collected over multiple times at a desired timing with relatively large power, using the sufficient power stored in the power storage 120. That is, it is active with respect to the information transmission. For example, it is possible to transfer information to the receiver 190 that is away, for example, several centimeters, several meters to tens of meters, several hundreds of meters, and several kilometers.

In addition, the power receiving-type information acquisition and transmission device 101 may readily set an information transmission timing of the information acquirer 130 using the collection timing controller 160 and thus, may collect information suitable for a corresponding purpose. Likewise, the power receiving-type information acquisition and transmission device 101 may readily set an information transmission timing of the information transmitter 140 using the transmission timing controller 170 and thus, may transmit information suitable for a corresponding purpose. In particular, if a setting signal is included in the power supply wave 105 as in the present embodiment, it is possible to change a timing in the middle.

Also, although the present embodiment describes a case in which the distribution controller 180, the collection timing controller 160, the controller 138, the transmission timing controller 170, and other constituent elements are separate blocks as an example, the present invention is not limited thereto. All of or a portion of the functions may be processed using a single chip, such as an IC or microcomputer. That is, the aforementioned configuration corresponds to a functional configuration. A hardware configuration may be appropriately selected and may be configured as, for example, an IC tag and a radio frequency (RF) tag.

Figure 6:
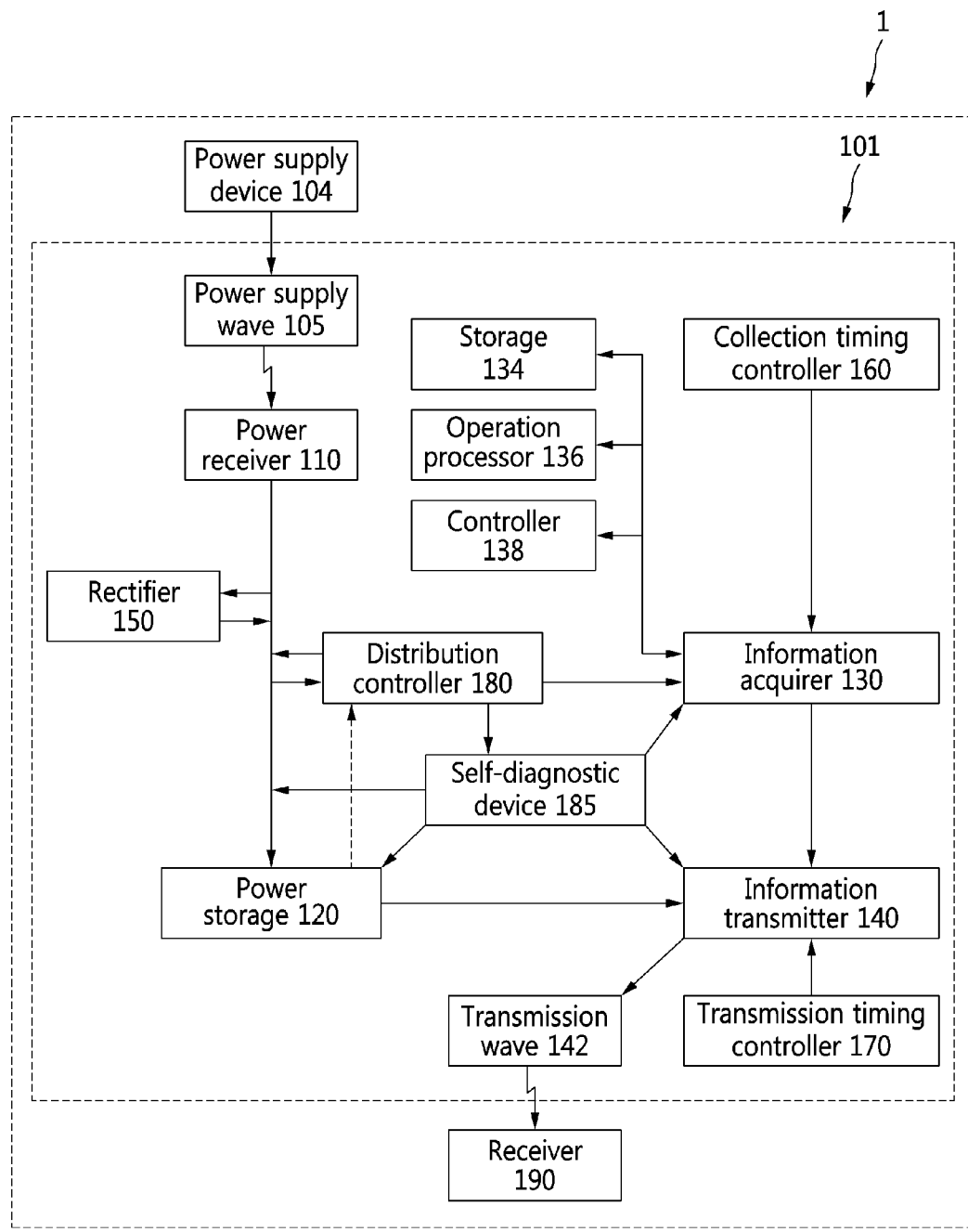
FIG. 6 is a block diagram illustrating another example of the entire configuration of the power receiving-type information acquisition and transmission device.

Also, in the embodiment, a self-diagnostic function may be added to the power receiving-type information acquisition and transmission device 101. For example, referring to FIG. 6, a self-diagnostic device (a self-diagnostic circuit) 185 independent from other circuits may be provided to the power receiving-side information acquisition and transmission device 101. The self-diagnostic device 185 is embedded with a timer device and transmits a diagnostic result periodically (for example, once a day) using the information transmitter 140. The contents of self-diagnosis include a storage amount (a power storage failure) of the power storage 120, a power reception failure (for example, checking a state of current flowing from the power receiver 110 to the power storage 120) of the power receiver 110, an operation failure (checking whether a signal is exchangeable) of the information acquirer 130, and an operation failure (checking whether a response operation is appropriate) of the storage 134 or the operation processor 136. Although the power storage 120 is degraded, the power of the self-diagnostic device 185 may be directly acquired from the distribution controller 180 to operate the self-diagnostic device 185. By periodically transmitting the diagnostic result to an outside, the receiver 190 side may verify a failure or a maintenance timing. By separating the self-diagnostic device 180 from another circuit (a main circuit), it is possible to verify whether the main body malfunctions or whether the self-diagnostic device 180 malfunctions. Also, since diagnosis information is transmitted from the self-diagnostic device 185 at a periodic timing based on the timer, it is possible to quickly recognize an occurrence of a failure in the main body when transmission of the diagnosis information is absent.

Hereinafter, an application example of the information acquisition system 1 that includes the power receiving-type information acquisition and transmission device 101 according to the present embodiment is described.

Figure 4:
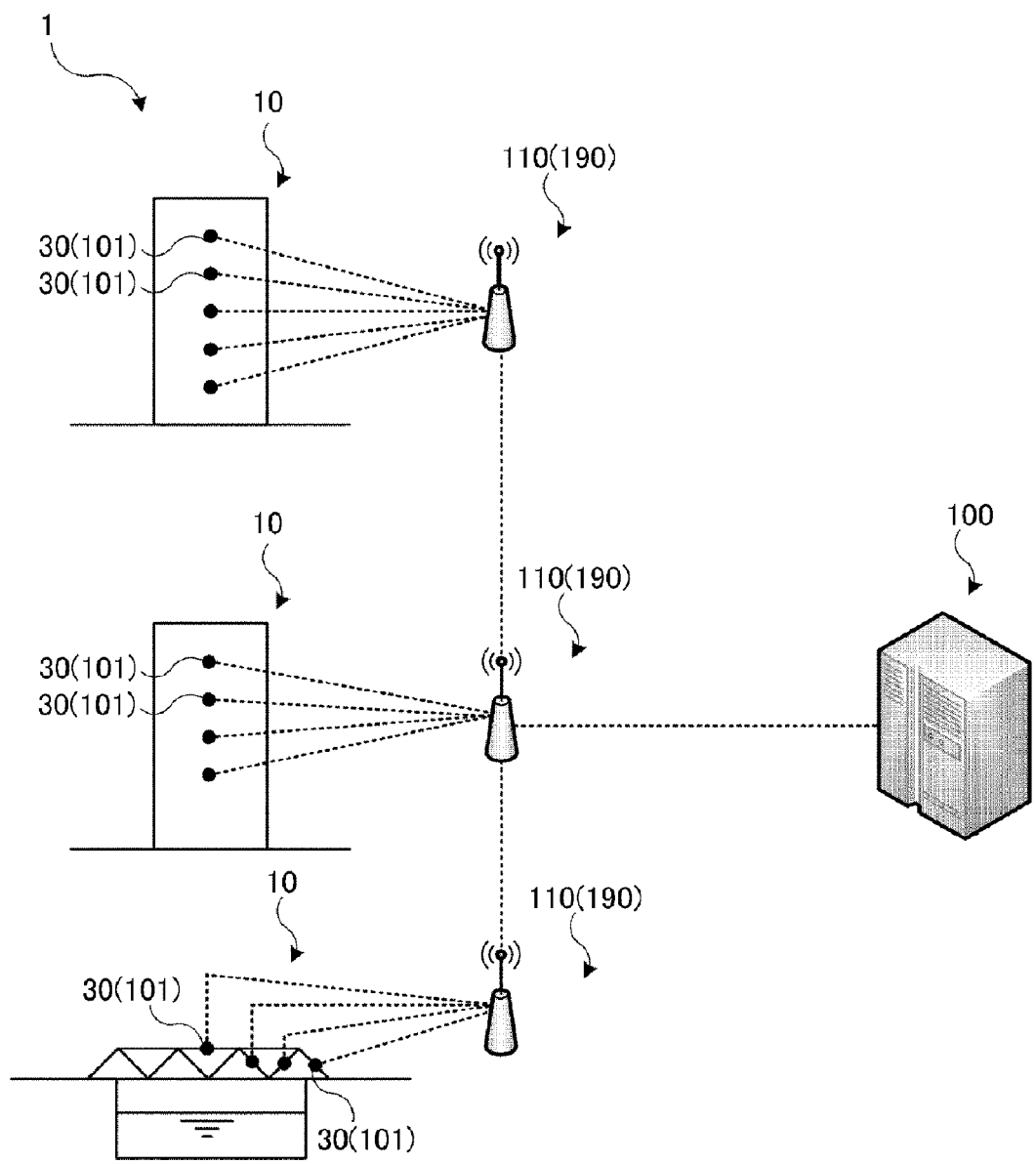
FIG. 4 illustrates an application example of an information acquisition system using the power receiving-type information acquisition and transmission device.

FIG. 4 illustrates an example in which the information acquisition system 1 is applied to a construction. The measurement system 1 includes a plurality of constructions 10, such as a building or a bridge, a conduction-path-equipped member 30 configured to define a structure of the construction 10, the power receiving-type information acquisition and transmission device 101 installed in the member 30, and the power supply device 104 configured to supply power to the power receiving-type information acquisition and transmission device 101. The power supply device 104 also serves as the receiver 190 and is provided to correspond to the power receiving-type information acquisition and transmission device 101 based on a construction unit or a smaller unit. The power supply device 104 is connected to a server 100 through a wired or wireless communication line.

Figure 5:
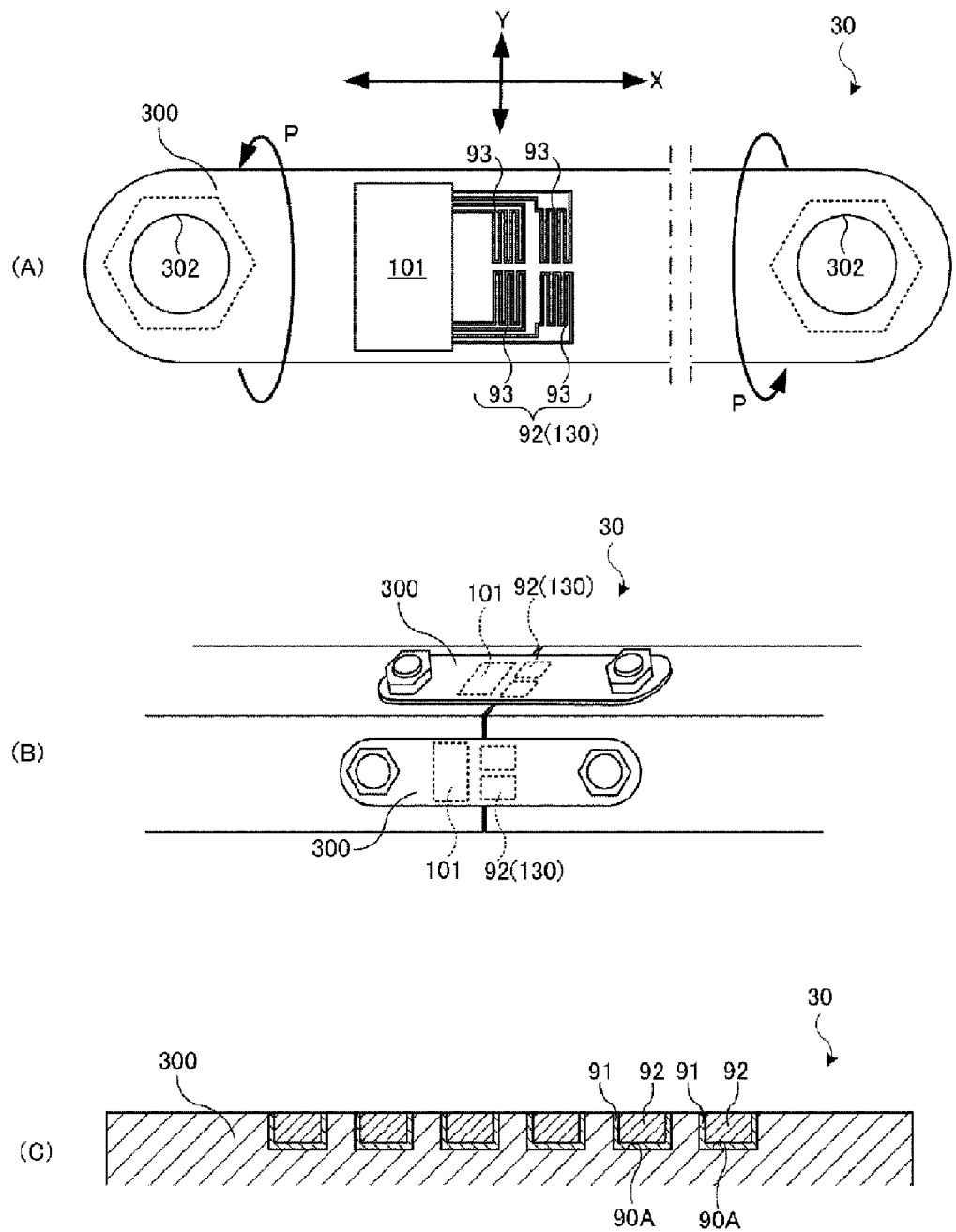
FIG. 5, (A), is a front view illustrating an example in which the power receiving-type information acquisition and transmission device of the information acquisition system is installed in a conduction-path-equipped member, (B), illustrates a state of using the conduction-path-equipped member for compulsory connection, and, (C), is a cross-sectional view of the conduction-path-equipped member.

Referring to (A) of FIG. 5, the conduction-path-equipped member 30 is provided in a structure in which a conduction path 92 is formed relative to a plate member 300, such as a metal. Also, engaging portions 302 for coupling with corresponding mating members by, for example, bolts are formed at two or more locations on the plate member 300. Referring to (B) of FIG. 5, the conduction-path-equipped member 30 (the plate member 300) may be used as a connection plate when coupling with a steel material by bolts. Various stress measurements may be performed by providing a plurality of plate members 300 in various directions.

Referring again to (A) of FIG. 5, the plate member 300 is extended, contracted, and twisted in response to a deformation of the mating member. A plurality of (four) first conduction paths 93 that reciprocate in a first direction X are provided to the plate member 300.

Referring to (C) of FIG. 5, a groove (a recessed portion) 90A that defines the conduction path 92 is formed on an outer circumferential surface of the plate member 300. An electric insulation layer 91 that is a base layer is formed on an inner circumferential surface of the groove 90A and the conduction path 92 is directly formed on the electric insulation layer 91. As a result, the conduction path 92 ends without contact with an external member and thus, it is possible to prohibit disconnection or peeling of the conduction path 92. The conduction path 92 includes a metallic material and is deformed as the conduction-path-equipped member 30 is deformed. When the conduction path 92 is deformed, an electrical characteristic, such as a resistance, varies and accordingly, the conduction path 92 outputs an intensity of stress generated in the conduction-path-equipped member 30. That is, the conduction path 92 constitutes all of or a portion of the information acquirer 130 in the power receiving-type information acquisition and transmission device 101.

The electric insulation layer 91 may employ, for example, multi-layer printing, pad printing, coating, plating, and inkjet printing. As another example, the electric insulation layer 91 may employ various schemes of, for example, forming a thin film by sputtering an insulating material in a state in which a mask is provided, by applying and heating a silica material, or by applying a polyimide-based organic insulating material.

According to the information acquisition system 1, the power supply device 104 may supply the power at all times to the power receiving-type information acquisition and transmission device 101 that is provided to the conduction-path-equipped member 30. At the same time, the power receiving-type information acquisition and transmission device 101 may regularly detect a stress that acts on the conduction-path-equipped member 30 and the information may be retrieved at the server 100 through the power supply device 104.

Figure 7:
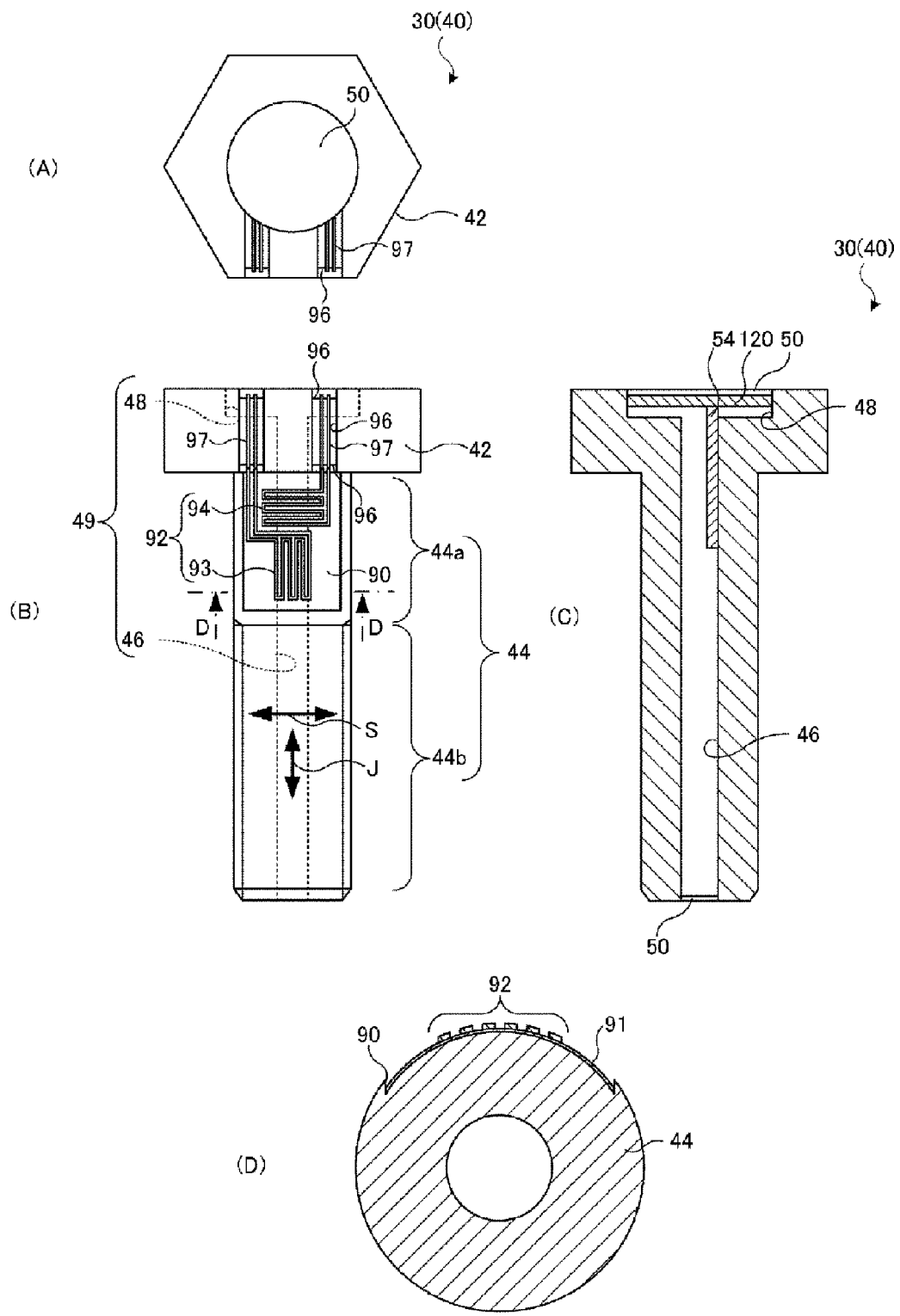
FIG. 7(A) is a top view illustrating an example in which the power receiving-type information acquisition and transmission device of the information acquisition system is installed in the conduction-path-equipped member.
FIG. 7(B) is a front view of the conduction-path-equipped member.
FIG. 7(C) and FIG. 7(D) are cross-sectional views of the conduction-path-equipped member.
Figure 8:
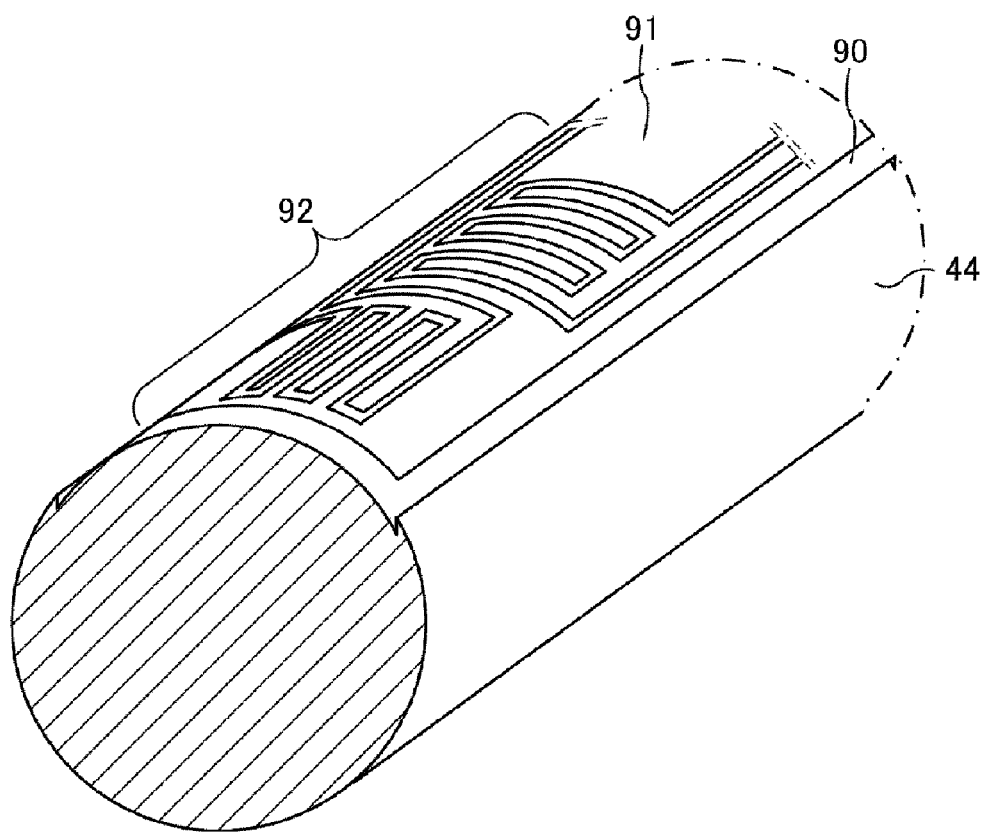
FIG. 8 is a perspective view of the conduction-path-equipped member.

Also, although the present embodiment describes a case in which all of or a portion of the information acquirer 130 is provided to the plate member 300, such as a metal, the present invention is not limited thereto. For example, FIGS. 7 and 8 illustrate a basic structure in a case in which a male screw body 40 is employed as the conduction-path-equipped member 30. The male screw body 40 is a so-called bolt, and includes a head part 42 and a shaft part 44. The shaft part 44 includes a cylindrical part 44a and a threaded part 44b. The cylindrical part 44a is not essential.

A head part receiving space 48 is formed in the head part 42, and a shaft part receiving space 46 extending in an axial direction is formed in the shaft part 44. The head part receiving space 48 and the shaft part receiving space 46 communicate, and have a structure in which the head part receiving space 48 extends more in a diameter direction than the shaft part receiving space 46. Herein, the head part receiving space 48 and the shaft part receiving space 46 are referred to as an internal space 49.

A recess 90 is formed on an outer circumferential surface of the cylindrical part 44a, and the conduction path 92 for stress measuring is formed on a cylindrical bottom surface of the recess 90. The conduction path 92 includes a metallic material, and is deformed as the conduction-path-equipped member 30 is deformed. When the conduction path 92 is deformed, an electrical characteristic, such as a resistance, varies and thus the conduction path 92 outputs an intensity of stress generated in the conduction-path-equipped member 30. The electric insulation layer 91 is formed directly on the bottom surface of the recess 90 and the conduction path 92 is formed directly on the electric insulation layer 91.

The electric insulation layer 91 may employ, for example, multi-layer printing, pad printing, coating, plating, and inkjet printing. As another example, the electric insulation layer 91 may employ various schemes of, for example, forming a thin film by sputtering an insulating material in a state in which a mask is disposed, by applying and heating a silica material, or by applying a polyimide-based organic insulating material.

The conduction path 92 includes a first conduction path 93 and a second conduction path 94 that are independently established in parallel. The first conduction path 93 extends to reciprocate along an axial direction J that is a first direction and detects a deformation of a surface of the conduction-path-equipped member 30 in the first direction. The second conduction path 94 extends to reciprocate along a circumferential direction S that is a second direction perpendicular to the first direction and detects a deformation of the surface of the conduction-path-equipped member 30 in the second direction. Although a case of providing a single first conduction path 93 is illustrated herein, a plurality of first conduction paths 93 may be disposed at locations having a predetermined phase difference (for example, 90° and 180°) in the circumferential direction, or at intervals in the axial direction. The same is applicable to the second conduction path 94. The conduction path 92 is formed directly on the recess 90 or the electric insulation layer 91 by multi-layer printing using a conductive paste, pad printing, coating, plating, plating, inkjet printing, or sputtering. A shape of a wiring may be set through etching by installing a mask corresponding to a shape of the conduction path 92. By directly forming the conduction path 92 as above, the conduction path 92 is not separated for a long time. In addition, when the conduction path 92 is provided using an adhesive layer including adhesive, an accurate stress may not be measured due to a degradation of the adhesive over time. Thus, it is not applicable herein.

Outer surfaces of the first conduction path 93 and the second conduction path 94 are set to not protrude from the recess 90. That is, a depth of the recess 90 is set to be great relative to a thickness of wiring of the first conduction path 93 and the second conduction path 94. Through this, it is possible to prevent a damage from occurring in the first conduction path 93 and the second conduction path 94 due to a contact with another member. Also, the outer surfaces of the first conduction path 93 and the second conduction path 94 may be protected by forming cover layers on the outer surfaces thereof. The cover layers may use an insulating material.

A recess 96 is also formed on a seat surface 42A and a peripheral surface 42B of the head part 42. A wiring 97 is formed in the recess 46 to supply electricity from the power storage (battery) 120 to the conduction path 92. Accordingly, although a member to be coupled is fastened by the seat surface 42A, the wiring 97 may not be in contact with the member to be coupled. Also, although the head part 42 is rotated by a tool such as a wrench, the tool and the wiring 97 may not be in contact.

A substrate 54 to which the wiring 97 is connected and the power storage (battery) 120 configured to supply power to the substrate 54 are received in the internal space 49. The power receiver 110 or the information transmitter 140 is formed on the substrate 54. Although the present embodiment describes a case in which the power storage 120 or the substrate 54 is embedded as an example, the power storage 120 or the substrate 54 may be provided outside.

Further, to prevent an inflow of foreign substances or moisture into the internal space 49, a cap 50 is provided in an opening portion of the internal space 49. By removing the cap 50 from the head part receiving space 48, the power storage (battery) 120 may be replaced or the substrate 54 may be maintained without separating the male screw body 40 from the construction 10.

The embodiments of the present invention are not limited to the aforementioned embodiments. Instead, various changes may be made to these embodiments without departing from the principles and spirit of the invention.

DESCRIPTION OF REFERENCE NUMERALS 1 information acquisition system
101 power receiving-type information acquisition and transmission device
104 power supply device
105 power supply wave
105A first un-modulated wave area 105B second un-modulated wave area
105C third un-modulated wave area
105X first modulated wave area
105Y second modulated wave area
110 power receiver
120 power storage
130 information acquirer
134 storage
136 operation processor
138 controller
140 information transmitter
142 transmission wave
142A first transmission signal area
142B second transmission signal area
150 rectifier
160 collection timing controller
170 transmission timing controller
170 transmission timing controller
180 distribution controller
190 receiver

What is claimed is:

1. An information acquisition system comprising:
a power receiving-type information acquisition and transmission device to be installed in a member to be measured; and
a power supply device configured to transmit a power supply wave capable of supplying power to a power receiver of the power receiving-side information acquisition and transmission device,
wherein the power receiving-type information acquisition and transmission device comprises:
the power receiver configured to receive a power supply wave capable of supplying power;
a power storage configured to accumulate power obtained by the power receiver;
an information acquirer configured to acquire information by using at least a portion of the power of the power receiver and/or the power storage;
an information transmitter configured to transmit the information to an outside by using the power of the power storage,
wherein the information acquirer is configured to measure a change in the member, and
wherein instruction information about a timing at which the information acquirer acquires the information is overlapped with respect to the power supply wave or instruction information about a timing at which the information transmitter transmits the information to the outside is overlapped with respect to the power supply wave.

2. The information acquisition system of claim 1, further comprising:
a receiver configured to receive the information that is transmitted to an outside from the information transmitter of the power receiving-type information acquisition and transmission device.

3. The information acquisition system of claim 2, wherein the power supply device and the receiver are integrated.

4. An Information acquisition system comprising: a power receiving-type information acquisition and transmission device to be installed in a member to be measured; and a power supply device configured to transmit a power supply wave capable of supplying power to a power receiver of the power receiving-side information acquisition and transmission device, wherein the power receiving-type information acquisition and transmission device comprises:
the power receiver configured to receive a power supply wave capable of supplying power;
a power storage configured to accumulate power obtained by the power receiver;
an information acquirer configured to acquire information by using at least a portion of the power of the power receiver and/or the power storage; and
an information transmitter configured to transmit the information to an outside by using the power of the power storage, and
wherein the information acquirer is configured to measure a change in the member, and
wherein a power supply amount per unit time supplied from the power supply device to the power receiving-side information acquisition and transmission device is greater than a power consumption amount per unit time including natural discharge of the power receiving-side information acquisition and transmission device.

5. An information acquisition system comprising: a power receiving-type information acquisition and transmission device to be installed in a member to be measured; and a power supply device configured to transmit a power supply wave capable of supplying power to a power receiver of the power receiving-side information acquisition and transmission device, wherein the power receiving-type information acquisition and transmission device comprises:
the power receiver configured to receive a power supply wave capable of supplying power;
a power storage configured to accumulate power obtained by the power receiver;
an information acquirer configured to acquire information by using at least a portion of the power of the power receiver and/or the power storage; and
an information transmitter configured to transmit the information to an outside by using the power of the power storage, and
wherein the information acquirer is configured to measure a change in the member, and
wherein a transmission amount of the power supply wave by the power supply device varies based on a transmission frequency of the information of the information transmitter or an acquisition frequency of the information of the information acquirer in the power receiving-type information acquisition and transmission device.

* * * * *